(12) United States Patent
Kochi et al.

(10) Patent No.: US 9,231,386 B2
(45) Date of Patent: Jan. 5, 2016

(54) ELECTRIC CABLE CUTTER

(75) Inventors: Minoru Kochi, Niigata (JP); Sadayoshi Kobayashi, Niigata (JP); Kentaro Abe, Niigata (JP)

(73) Assignee: TOA INTERSYSTEM INC., Niigata (JP)

( * ) Notice: Subject to any disclaimer, the term of this patent is extended or adjusted under 35 U.S.C. 154(b) by 204 days.

(21) Appl. No.: 14/007,367

(22) PCT Filed: Mar. 12, 2012

(86) PCT No.: PCT/JP2012/056276
§ 371 (c)(1),
(2), (4) Date: Sep. 25, 2013

(87) PCT Pub. No.: WO2012/132858
PCT Pub. Date: Oct. 4, 2012

(65) Prior Publication Data
US 2014/0007433 A1  Jan. 9, 2014

(30) Foreign Application Priority Data

Mar. 29, 2011 (JP) ................. 2011-072559

(51) Int. Cl.
| | |
|---|---|
| *B26B 15/00* | (2006.01) |
| *H02G 1/00* | (2006.01) |
| *A01G 3/06* | (2006.01) |
| *B23D 17/04* | (2006.01) |
| *B23D 29/00* | (2006.01) |

(52) U.S. Cl.
CPC ............ *H02G 1/005* (2013.01); *A01G 3/067* (2013.01); *B23D 17/04* (2013.01); *B23D 29/002* (2013.01); *B26B 15/00* (2013.01)

(58) Field of Classification Search
CPC ...... B23D 23/00; B23D 17/04; B23D 29/002; H02G 1/005; B25F 5/025; A01G 3/067; B26B 15/00
USPC ............ 30/228, 247, 92, 250, 95, 277.4, 249; 464/102, 104–105; 192/39, 46
See application file for complete search history.

(56) References Cited

U.S. PATENT DOCUMENTS

| | | | |
|---|---|---|---|
| 2,303,531 A * | 12/1942 | Eyster | 451/357 |
| 5,987,754 A | 11/1999 | Hirabayashi et al. | |
| 2005/0081388 A1* | 4/2005 | Konen | 30/228 |
| 2008/0006134 A1 | 1/2008 | Konen | |
| 2010/0199821 A1* | 8/2010 | Kawakami | 83/54 |
| 2010/0325894 A1* | 12/2010 | Scott et al. | 30/92 |
| 2012/0129435 A1* | 5/2012 | Ikuta | 451/358 |

FOREIGN PATENT DOCUMENTS

| | | |
|---|---|---|
| JP | 10-249630 | 9/1998 |
| JP | 2002-160119 | 6/2002 |
| JP | 2005-125486 | 5/2005 |

OTHER PUBLICATIONS

International Search Report mailed Apr. 3, 2012 in International (PCT) Application No. PCT/JP2012/056276.

* cited by examiner

*Primary Examiner* — Ned Landrum
*Assistant Examiner* — Nhat Chieu Do
(74) *Attorney, Agent, or Firm* — Wenderoth, Lind & Ponack, L.L.P.

(57) ABSTRACT

An electric cable cutter used with a hand-held tool includes a housing; a pair of cutting blades supported by the housing; a pair of orthogonal gears; a drive shaft with an eccentric shaft portion attached to an output gear of the pair of orthogonal gears; a differential gear mechanism which decelerates a rotation of the drive shaft; and an Oldham coupling which corrects an eccentric rotation of an output gear of the differential gear mechanism. A circular-arc-shaped outer surface of the one cutting blade is supported by the other cutting blade so as to be openable and closable. The pair of cutting blades is provided with an outer toothed portion engaging with an output gear of the Oldham coupling. An input gear of the pair of orthogonal gears is connected through an adapter pin to the hand-held tool attachable and detachable through a one-touch operation.

20 Claims, 13 Drawing Sheets

F I G. 4
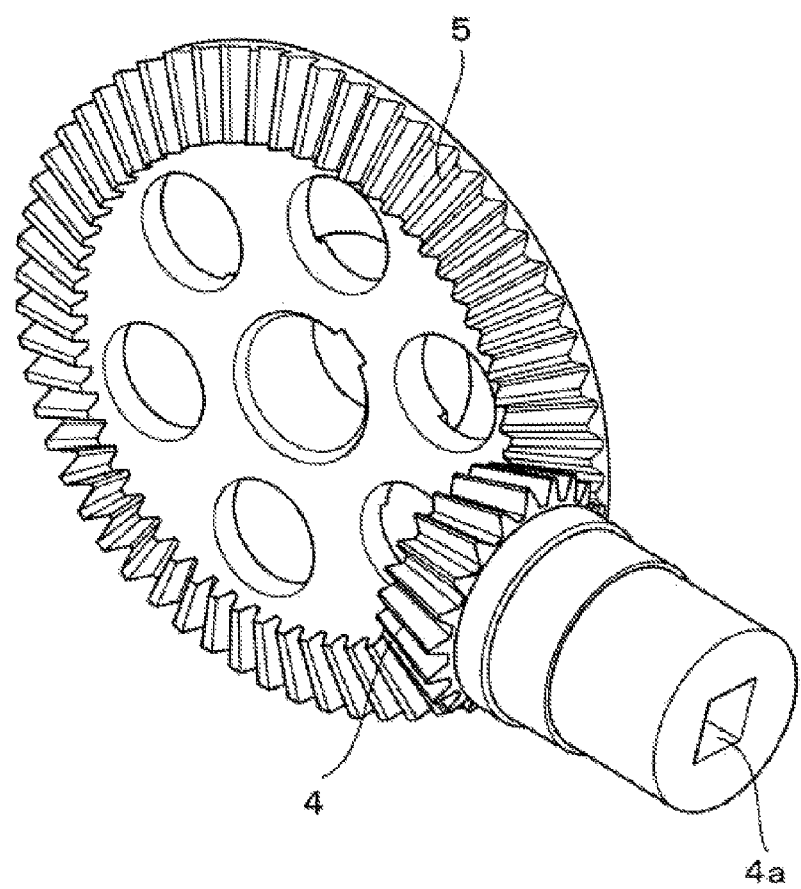

ELECTRIC CABLE CUTTER

TECHNICAL FIELD

The present invention relates to an electric cable cutter which cuts, for example, various cables such as a wire rope, an electric wire, a communication wire, and a reinforced bar, and more particularly, to an electric cable cutter which is used together with a standard hand-held tool as a power source.

BACKGROUND ART

A cable cutter is largely classified into three types, that is, a manual type, a hydraulic type, and an electric type, and each type has strong and weak points. The first manual type cutter has strong points that the maintenance and the management of the cutter may be performed easily and the cost of the cutter is reasonable, but has a weak point that the operator's physical burden is required. The second hydraulic cutter has a strong point that the operator's physical burden may be reduced, but has weak points that a problem in maintenance such as an oil leak of the cutter occurs, the cutter may not be easily carried due to the weight of the cutter, and the cost of the cutter increases. The third electric cutter also has a strong point that the operator's physical burden may be reduced, but has a weak point that the cost of the cutter is particularly high because the cutter currently available in the market is a specialized tool integrated with a power output unit and the broken cutter needs to be repaired by a maker.

Therefore, in consideration of the above-described circumstances, there is proposed an attachment type cable cutter which obtains a power source in a standard hand-held type electric drill and uses the cable cutter by the electricity obtained through the connection of the cable cutter with respect to the electric drill (for example, see Patent Literature 1).

Although not illustrated in the drawings in detail, the electric cable cutter includes a housing which serves as a gear box, a pair of fixed and movable cutting blades which is supported by the housing so as to relatively rotate, a drive shaft which rotatably extends from the housing and is detachably connected to a chuck of an electric drill, a worm which is attached into the housing and rotates along with the drive shaft, a main shaft which is attached to the housing so as to rotate therein, a worm wheel which is attached to the main shaft and engages with the worm, and a driving gear which is attached to the main shaft and engages with an outer toothed portion of the movable cutting blade.

In addition, the fixed cutting blade and the movable cutting blade which are supported by the housing are configured as a handcuff type, the base end of the fixed cutting blade is fixed to the housing, and the movable cutting blade is axially supported by the front end of the fixed cutting blade so as to be rotatable. However, the fixed cutting blade is positioned at the upper side of the movable cutting blade, and the movable cutting blade is axially supported while being positioned at the lower side of the fixed cutting blade. Then, when the worm is rotated by the drive shaft to which the power of the hand-held type electric drill is input, the worm wheel and the driving gear rotate through the main shaft, and the movable cutting blade rotates while its outer toothed portion engages with the driving gear, so that the cable is cut by male and female blade portions formed at the inner edges of the respective cutting blades.

Further, a cylindrical portion is laterally formed at the lower side of the housing, holding tools for holding ends of a grip handle and a fixed arm are inserted from both sides of the cylindrical portion so as to be screw-connected to both ends, one end of the fixed arm is fitted into a through-hole of the holding tool, and the other end of the fixed arm is fitted to a handle of the electric drill.

Then, when actually cutting the cable, the drive shaft is connected to the chuck of the electric drill, the cable cutter is attached to the electric drill, the cable passes through a void space defined between the movable cutting blade and the fixed cutting blade, the outer toothed portion of the movable cutting blade engages with the driving gear, and an operator grips the grip handle by a left hand and switches on the electric drill while gripping the handle of the electric drill by a right hand, so that the movable cutting blade automatically rotates until the void space becomes zero. Accordingly, the cable is automatically cut by the movable cutting blade and the fixed cutting blade.

CITATION LIST

Patent Literature

Patent Literature 1: JP 2005-125486 A

SUMMARY OF INVENTION

However, since the conventional electric cable cutter employs a worm gear mechanism including a worm and a worm wheel as a speed reducing mechanism as described above, a greater frictional force is applied than expected between the worm and the worm wheel during the cutting operation. For this reason, the ability of the electric drill is not easily transferred to the front edge of the cutting blade and the gear needs to be replaced after the use for a predetermined period of time. Thus, some problems occur in maintenance. Further, since the weight of the cable cutter increases under the worm gear mechanism, the cable cutter may not be comfortably handled.

Further, in the conventional cable cutter, the fixed and movable cutting blades are respectively positioned at the upper and lower sides with respect to the housing, and the movable cutting blade rotates in a direction from the lower side toward the upper side. Accordingly, when the cable is inserted through the void space defined between the movable cutting blade and the fixed cutting blade, the cable is directed downward due to its own weight and the movable cutting blade is also directed downward due to its own weight. For this reason, when performing the cutting operation, there is a need to perform an operation in which the operator supports both the back side of the movable cutting blade and the cable by the hand until the movable cutting blade and the driving gear reliably engage with each other. Thus, in the handcuff type cutting blade, there is a need to perform a troublesome operation before the cutting operation. Particularly, in this operation, there is a need to check if the outer toothed portion of the movable cutting blade completely engages with the driving gear, and hence even this operation makes the operation hard.

Further, since the grip handle held by the left hand of the operator is positioned at the lower left side of the housing, when the operator supports the movable cutting blade and the cable by the right hand while gripping the grip handle by the left hand at the lower left side of the housing upon starting the cutting operation, the operator feels a large burden at the left hand. On the contrary, when the operator supports the movable cutting blade and the cable by the left hand while gripping the handle of the electric drill by the right hand, the operator feels the pair of cutting blades at the front end heavy, and hence there is a concern that the operator may not support the cable cutter only by the right hand.

The invention is contrived to effectively solve the problems of the conventional electric cable cutter, and a first aspect of the invention provides an electric cable cutter which is used together with a standard hand-held tool as a power source, and the electric cable cutter includes: a housing which serves as a gear box; a pair of cutting blades which is supported by the housing and is relatively opened and closed; a pair of orthogonal gears to which power is input from the hand-held tool; a drive shaft which includes an eccentric shaft portion attached to an output gear of the pair of orthogonal gears; a differential gear mechanism which decelerates a rotation of the drive shaft; and an Oldham coupling which corrects an eccentric rotation of an output gear of the differential gear mechanism to a rotation about a center axis, wherein a circular-arc-shaped outer surface of the other cutting blade axially supported by one cutting blade so as to be openable and closable in the pair of cutting blades is provided with an outer toothed portion engaging with an output gear of the Oldham coupling and an input gear of the pair of orthogonal gears is connected to the hand-held tool through an adapter pin which is attachable and detachable through a one-touch operation.

A second aspect of the invention provides the electric cable cutter according to the first aspect, wherein the pair of orthogonal gears includes large and small bevel gears.

A third aspect of the invention provides the electric cable cutter according to the first or second aspect, wherein the differential gear mechanism includes an inner toothed gear fixed to the housing and a planetary gear engaging with the inner toothed gear and attached to the eccentric shaft portion of the drive shaft, and one surface of the planetary gear is provided with a convex portion.

A fourth aspect of the invention provides the electric cable cutter according to the third aspect, wherein the Oldham coupling includes a first slider without a gear and a second slider with a gear, one surface of the first slider is provided with a first concave portion engaging with the convex portion of the planetary gear in a slidable manner, the other surface of the first slider is provided with a first convex portion perpendicular to the thalweg direction of the first concave portion, one surface of the second slider is provided with an output gear engaging with the outer toothed portion of the other cutting blade, and the other surface of the second slider is provided with a second concave portion engaging with the first convex portion of the first slider in a slidable manner.

A fifth aspect of the invention provides the electric cable cutter according to any one of the first to fourth aspects, wherein the grip handle is formed in a U-shape and both end portions thereof are fixed to a bracket portion of the housing.

A sixth aspect of the invention provides the electric cable cutter according to any one of the first to fifth aspects, and the electric cable cutter further includes a safety cover which covers the outer toothed portion of the other cutting blade.

Accordingly, in the invention, since the differential gear mechanism including the inner toothed gear and the planetary gear is used as the speed reducing mechanism unlike the related art, the housing may be decreased in thickness and size compared to the worm gear mechanism, and hence the ability of the hand-held tool as the power source may be fully transferred to the front edge of the cutting blade. Further, since the operation of attaching and detaching the electric cable cutter to and from the hand-held tool is performed through the adapter pin, the operation may be simply performed as if the adapter is attached to and detached from a socket wrench. Further, the attachment subject is not limited to the electric drill as in the related art, and the electric cable cutter may be attached to a chargeable electric driver, a pneumatic/electric/chargeable impact wrench without a drill chuck, or an electric/chargeable impact driver that is recently distributed to the market. In a case where the charged power of the hand-held tool is consumed up, a manual socket handle may be used as an alternative.

In particular, when the differential gear mechanism includes the inner toothed gear fixed to the housing and the planetary gear engaging with the inner toothed gear, the cable cutter may be further decreased in thickness and size.

Further, in the invention, since the Oldham coupling is used to correct the eccentric rotation of the planetary gear of the differential gear mechanism to the rotation about the center axis, the difference may be reliably absorbed by the planetary gear and the first and second orthogonal sliders, a large rotation force may be transferred by the uniform-speed rotation.

Further, in the invention, since the grip of the grip handle gripped by the left hand is formed in a U-shape having three side portions of an upper portion, a lateral portion, and a lower portion, the operator may perform the connection with the hand-held tool with a good balance when preparing the work by gripping the upper base of the grip handle, and may change the grip position if necessary after starting the work. For example, when the cable is cut laterally, the operator grips the upper portion of the grip handle. Then, when the cable is cut longitudinally, the operator grips the lateral portion of the grip handle and moves the grip position toward the upper portion of the cable. In this way, the operator may effortlessly perform the work.

Further, since the safety cover is provided so as to cover the outer toothed portion of the movable cutting blade, it is possible to ensure the safe operation by preventing a bare hand or a protection glove from being rolled into the blade.

BRIEF DESCRIPTION OF DRAWINGS

FIG. 4 is an explanatory diagram illustrating a relation between a small bevel gear and a large bevel gear.

DETAILED DESCRIPTION OF THE INVENTION

The invention provides an electric cable cutter that easily cuts a cable on the assumption that an electric cable cutter which is used together with a standard hand-held tool as a power source, the electric cable cutter including: a housing which serves as a gear box; a pair of cutting blades which is supported by the housing and is relatively opened and closed; a pair of orthogonal gears to which power is input from the hand-held tool; a drive shaft which includes an eccentric shaft portion attached to an output gear of the pair of orthogonal gears; a differential gear mechanism which decelerates a rotation of the drive shaft; and an Oldham coupling which corrects an eccentric rotation of an output gear of the differential gear mechanism to a rotation about a center axis, wherein a circular-arc-shaped outer surface of the other cutting blade axially supported by one cutting blade so as to be openable and closable in the pair of cutting blades is provided with an outer toothed portion engaging with an output gear of the Oldham coupling, and an input gear of the pair of orthogonal gears is connected to the hand-held tool through an adapter pin which is attachable and detachable through a one-touch operation.

Embodiment

Figure 1:
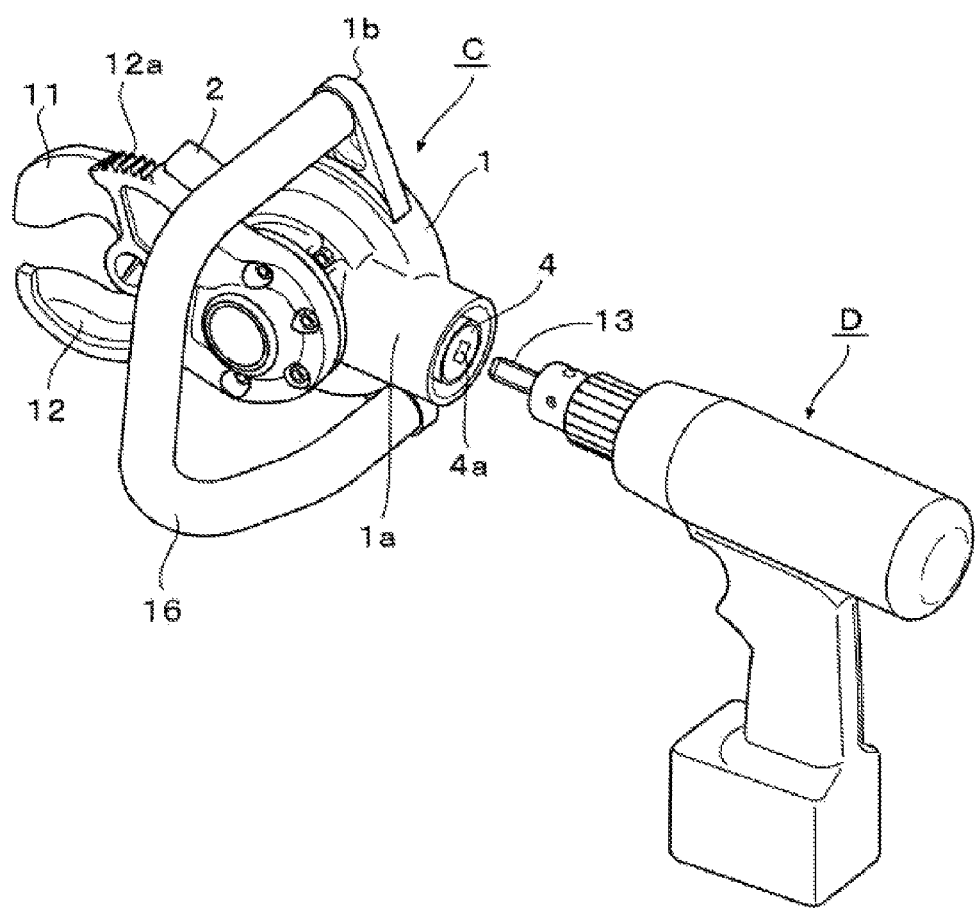
FIG. 1 is an exploded perspective view illustrating an electric cable cutter according to an embodiment of the invention by the relation with respect to an electric drill.

Hereinafter, the invention will be described in detail by referring to preferred embodiments illustrated in the drawings. As illustrated in FIG. 1, even an electric cable cutter C according to the embodiment is used together with a standard hand-held type electric drill D as in the related art, and a cable is cut by a fixed cutting blade 11 and a movable cutting blade 12 by using the electric drill D as a power source. For this reason, the operator's physical burden is reduced, and the cost is reduced to ¼ of the cost of the cutter integrated with the power source unit used so far. However, in the embodiment, the electric drill D with an electric accumulator is used in consideration of the portability, the invention is not limited thereto.

Figure 2:
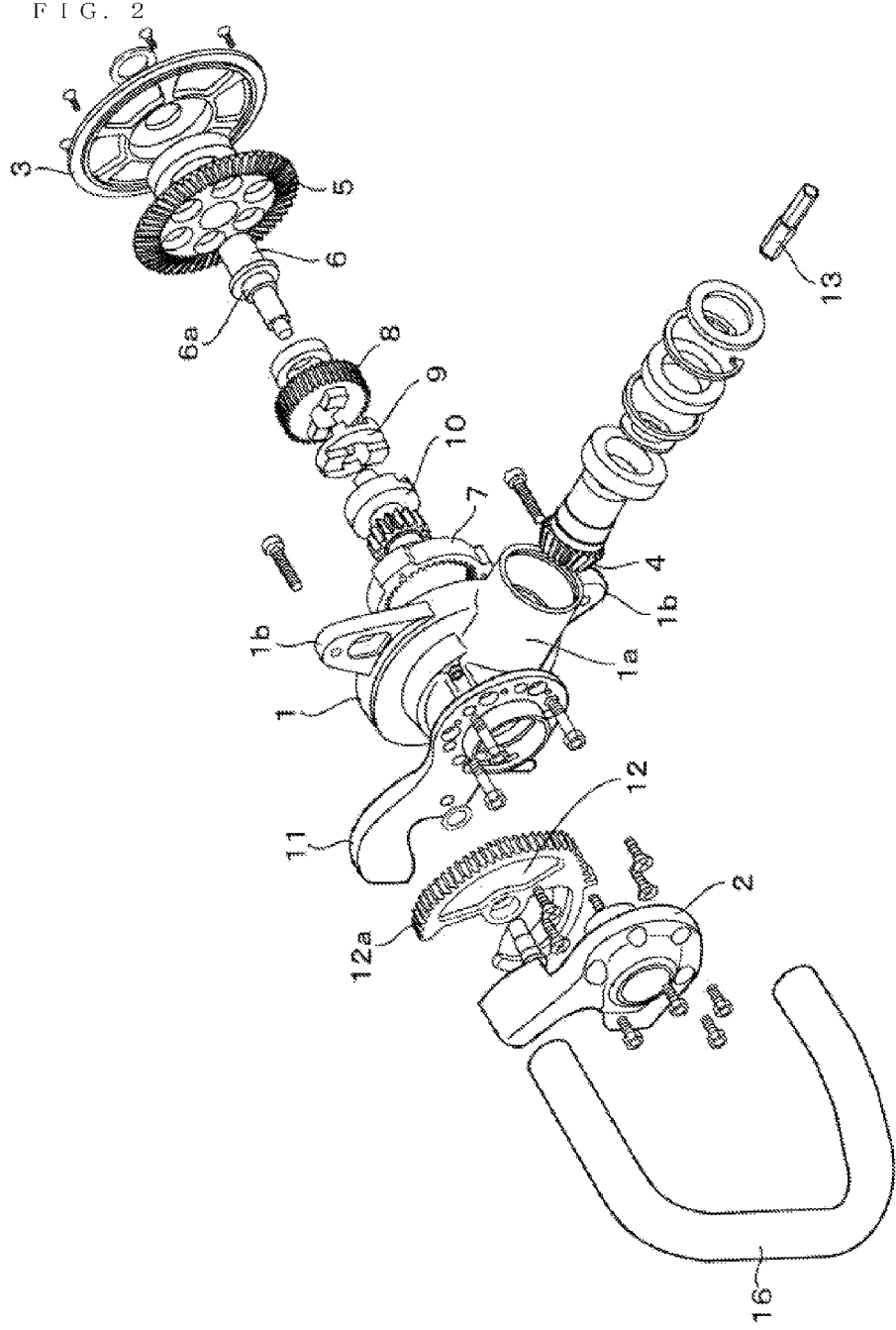
FIG. 2 is an exploded perspective view illustrating the cable cutter from the left side.
Figure 3:
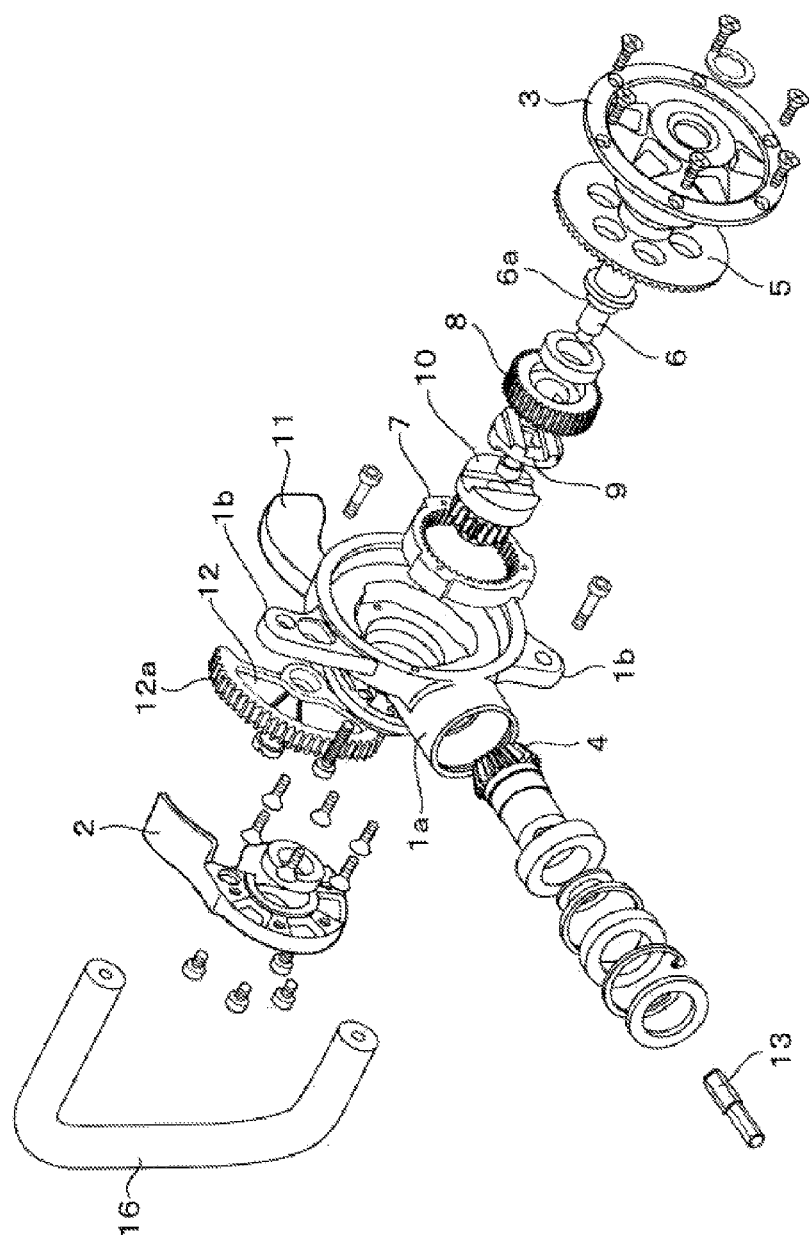
FIG. 3 is an exploded perspective view illustrating the cable cutter from the right side.

Therefore, the specific structure of the electric cable cutter will be described. In the embodiment, the electric cable cutter includes a housing 1 which accommodates a gear group to be described later thereinside. As illustrated in FIGS. 2 and 3, the housing 1 is formed in a cylindrical shape which has both opened side surfaces and has a small width. Here, the center portion of the housing is provided with a cylindrical box portion 1a which is provided in a direction perpendicular to the axial direction of the housing 1 so as to communicate with the inside thereof, the upper and lower portions of the housing are provided with a pair of bracket portions 1b which is provided uprightly so as to fix both end portions of a grip handle 16 to be described later, the left opening is blocked by a cutting blade side safety cover 2, and the right opening is blocked by a large bevel gear side cover 3.

Figure 5:
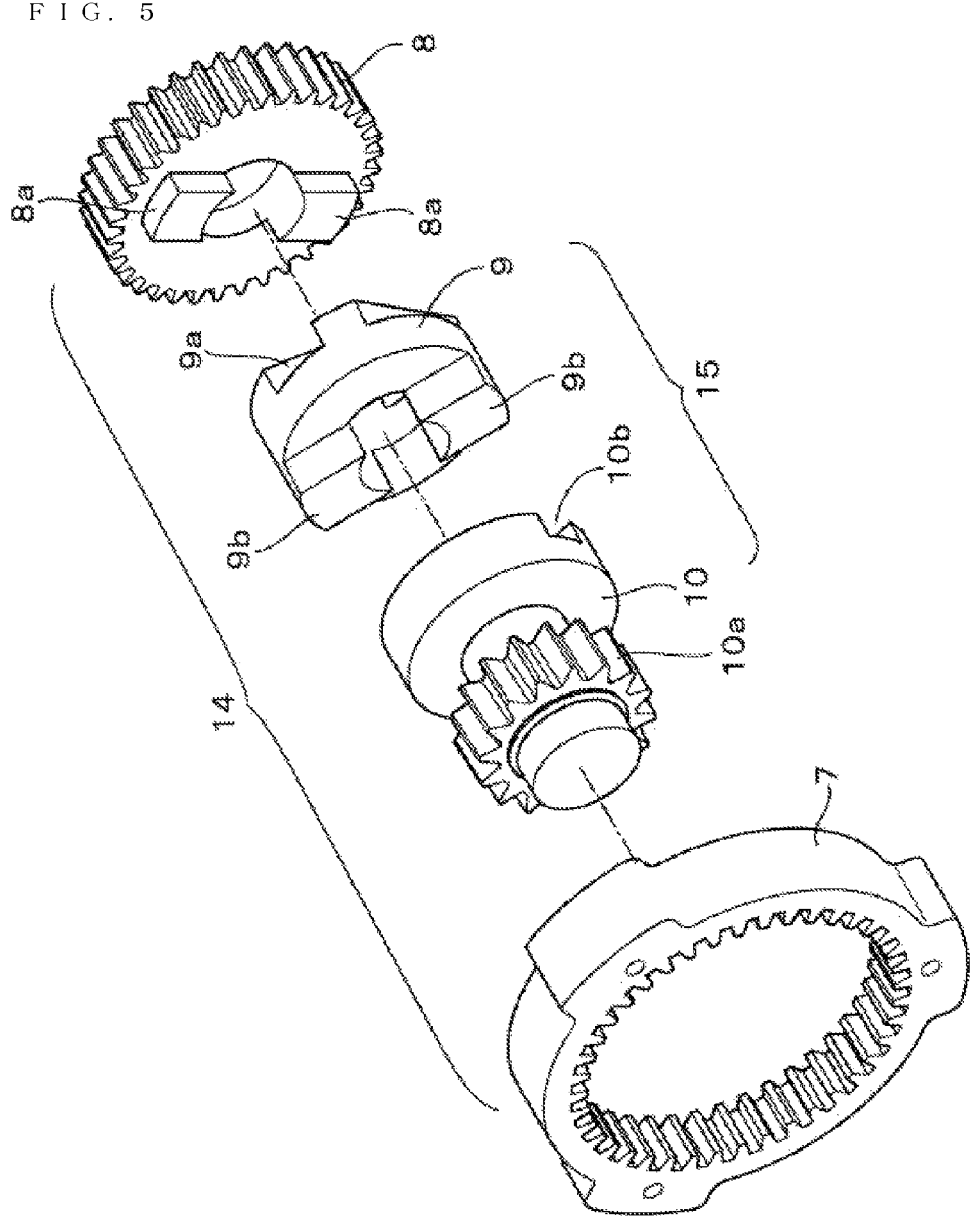
FIG. 5 is an exploded perspective view illustrating a relation between a differential gear mechanism including an inner toothed gear and a planetary gear and an Oldham coupling including a first slider and a second slider.
Figure 6:
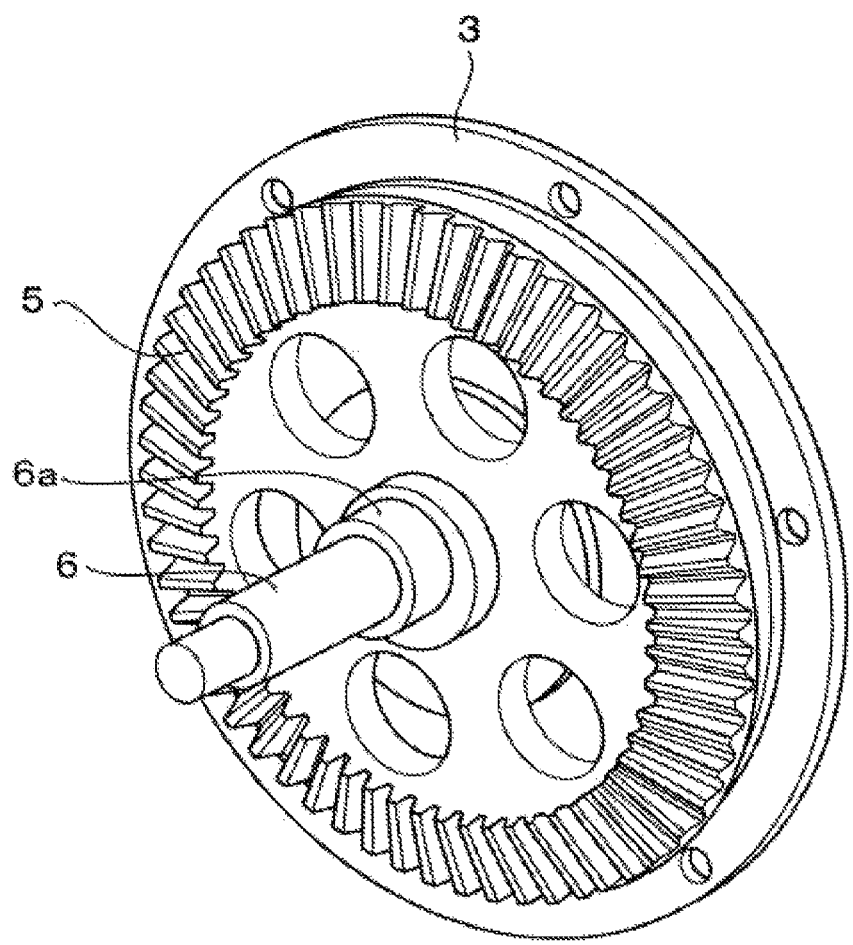
FIG. 6 is an explanatory diagram illustrating a relation among a cover, a large bevel gear, and a drive shaft.

Further, in the embodiment, as illustrated in FIGS. 4, 5, and 6, the electric cable cutter includes a small bevel gear 4 which is rotatably accommodated inside the cylindrical box portion 1a of the housing 1, a large bevel gear 5 which is rotatably attached to the cover 3 and engages with the small bevel gear 4 in a direction perpendicular thereto, a drive shaft 6 attached with an eccentric shaft portion 6a which is fixed to the large bevel gear 5 and rotates together with the large bevel gear, an inner toothed gear 7 which is fixed to the edge of the right opening of the housing 1, a planetary gear 8 which engages with the inner toothed gear 7 and moves while repeating the revolution and the rotation thereof, a first slider 9 which does not have a gear, a second slider 10 which has a gear, the fixed cutting blade 11 which is fixed to the left opening of the housing 1, and the movable cutting blade 12 which is axially supported by the fixed cutting blade 11 so as to be openable and closable.

Then, the rear end surface of the small bevel gear 4 is provided with a square hole 4a to which an adapter pin 13 connected to the electric drill D is fitted to be attachable and detachable through a one-touch operation. As illustrated in FIG. 6, the rear end of the drive shaft 6 is provided with the eccentric shaft portion 6a, the planetary gear 8 is fixed to the eccentric shaft portion 6a, the planetary gear 8 and the inner toothed gear 7 constitute a differential gear mechanism 14 as a speed reducing mechanism, and the first slider 9 and the second slider 10 constitute an Oldham coupling 15 which corrects the eccentric rotation of the planetary gear 8 to the rotation about the center axis. Furthermore, the adapter pin 13 is formed in a bar shape, the front end thereof is formed in a die shape which is fitted to the square hole 4a of the small bevel gear 4, and the rear end thereof is formed as a bit which is fixed to a chuck of the electric drill D.

Further, as illustrated in the drawings, a convex portion 8a is formed around a shaft hole of one surface of the planetary gear 8, a first concave portion 9a which engages with the convex portion 8a of the planetary gear 8 in a slidable manner is formed in one surface of the first slider 9 which does not have a gear and constitutes the Oldham coupling 15, a first convex portion 9b which is perpendicular to the thalweg direction of the first concave portion 9a is formed in the other surface thereof, an output gear 10a which engages with an outer toothed portion 12a of the movable cutting blade 12 to be described later is formed in one surface of the second slider 10 which has a gear, and a second concave portion 10b which engages with the first convex portion 9b in a slidable manner is formed in the other surface thereof.

Furthermore, the fixed cutting blade 11 and the movable cutting blade 12 are configured as a scissors type instead of the conventional handcuff type, the fixed cutting blade 11 is fixed to the left opening edge of the housing 1 through a bolt, and the circular-arc-shaped outer surface of the rear end of the movable cutting blade 12 which is axially supported by the fixed cutting blade 11 so as to be openable and closable is provided with the outer toothed portion 12a that is continuously formed so as to engage with the output gear 10a of the second slider 10.

Further, as illustrated in the drawings, the grip handle 16 which is fixed to the upper and lower bracket portions 1b of the housing 1 is formed in a U-shape in the lateral side. The operator may perform the connection with the hand-held tool with a good balance when preparing to start the work by gripping the upper base of the grip handle 16, and may change the grip position if necessary after starting the work. For example, when cutting the cable laterally, the operator grips the upper portion of the grip handle 16. Then, when cutting the cable longitudinally, the operator grips the lateral portion of the grip handle 16 and moves the grip position toward the upper portion of the cable. In this way, the operator may effortlessly perform the work.

Figure 7:
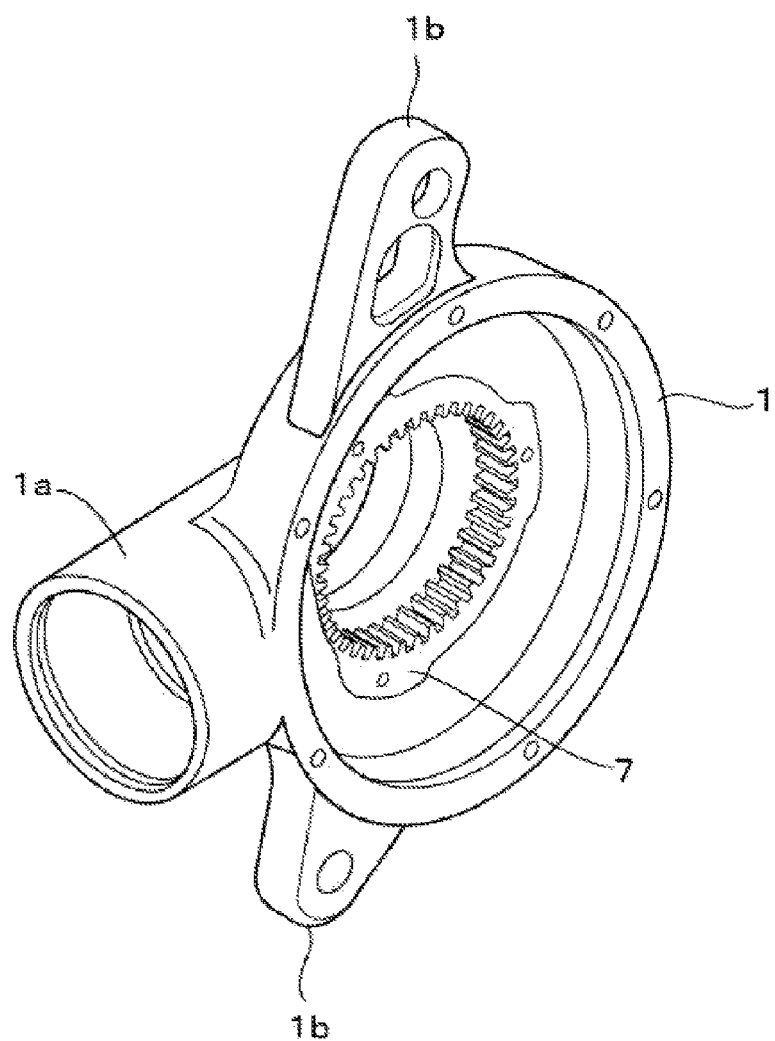
FIG. 7 is an explanatory diagram illustrating a relation between a housing and an inner toothed gear.
Figure 8:
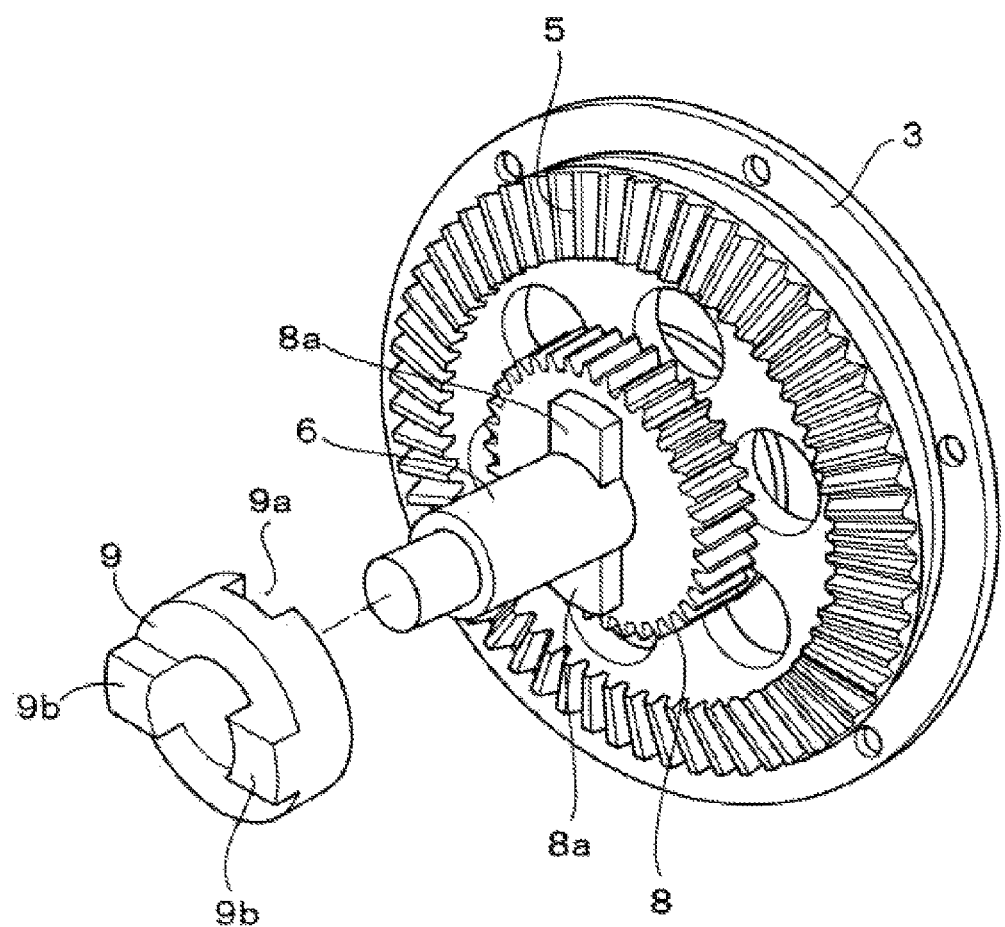
FIG. 8 is an explanatory diagram illustrating a relation among a cover, a large bevel gear, a planetary gear, a drive shaft, and a first slider.

Then, when assembling the electric cable cutter C with such a configuration, first, the inner toothed gear 7 may be fixed to the right opening edge of the housing 1 through a bolt as illustrated in FIG. 7. Then, the large bevel gear 5 is rotatably supported by the cover 3 while the drive shaft 6 is fixed to the large bevel gear 5 as illustrated in FIG. 6, and the planetary gear 8 is fixed to the eccentric shaft portion 6*a* of the drive shaft 6 as illustrated in FIG. 8. Thus, the planetary gear 8 rotates while repeating the revolution and the rotation thereof in response to the rotation of the drive shaft 6, but eccentrically rotates due to the relation with the eccentric shaft portion 6*a*.

Figure 9:
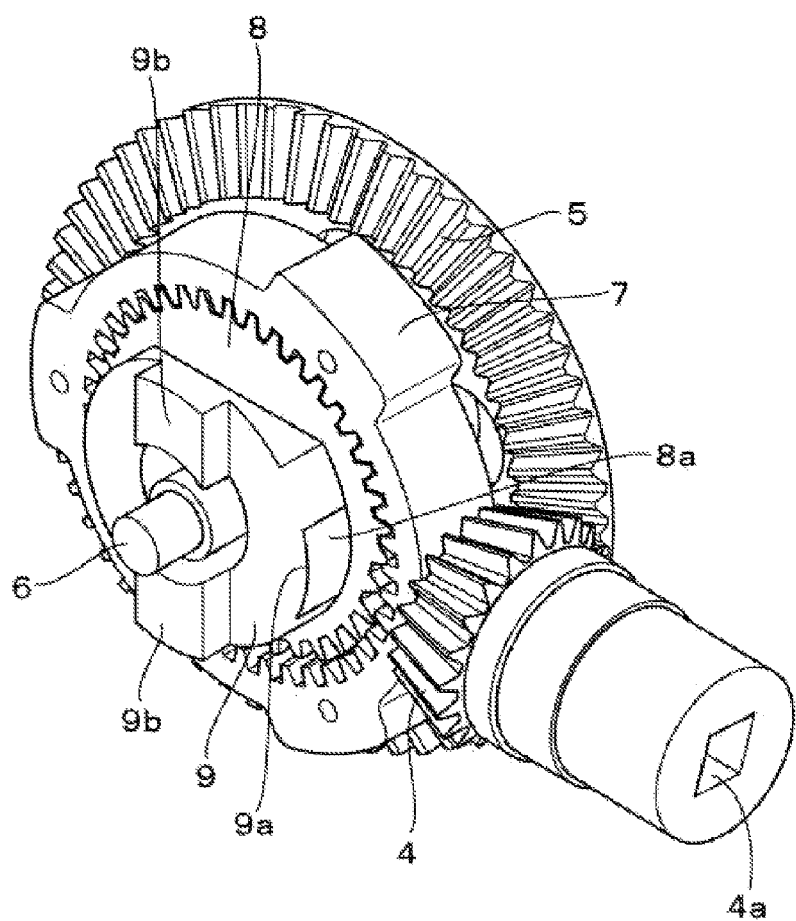
FIG. 9 is an explanatory diagram illustrating a state where a planetary gear and a first slider engage with each other in a slidable manner.

Then, at this time, the first slider 9 constituting the Oldham coupling 15 is rotatably attached to the drive shaft 6 as illustrated in FIG. 9. However, in this case, this attachment is performed while the convex portion 8*a* of the planetary gear 8 engages with the first concave portion 9*a* of the first slider 9 in a slidable manner. Thus, when the planetary gear 8 eccentrically rotates, the first slider 9 rotates in a sliding manner with respect to the planetary gear 8 by the guiding of the unevenness.

Figure 10:
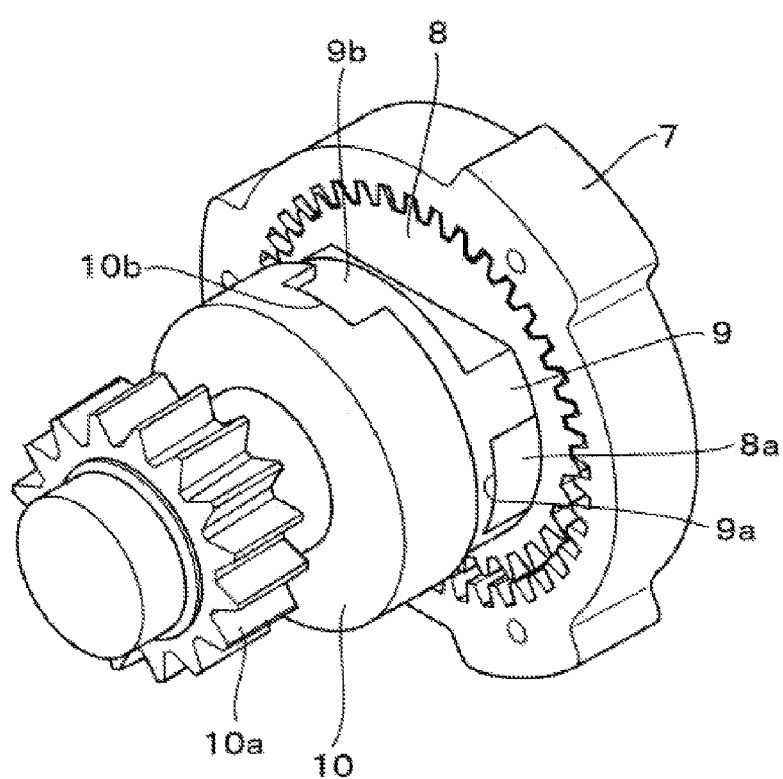
FIG. 10 is an explanatory diagram illustrating a state where the first slider and the second slider engage with each other in a slidable manner.

Next, as illustrated in FIG. 10, the second slider 10 constituting the Oldham coupling 15 is further rotatably attached to the front end of the drive shaft 6. However, even in this case, the attachment is performed while the convex portion 9*b* of the first slider 9 engages with the second concave portion 10*b* of the second slider 10 in a slidable manner. Thus, when the first slider 9 rotates in a sliding manner, the second slider 10 also rotates while sliding with respect to the first slider 9 by the guiding of the unevenness. However, since the first convex portion 9*b* of the first slider 9 and the second concave portion 10*b* of the second slider 10 engage with each other while the concave portion 9*a* of the first slider 9 is perpendicular to the convex portion 8*a* of the planetary gear 8, the first slider 9 and the second slider 10 slide while being perpendicular to each other, accordingly, the rotation of the planetary gear 8 is extracted, and the eccentric rotation of the planetary gear 8 may be corrected to the rotation about the center axis of the drive shaft 6.

Figure 11:
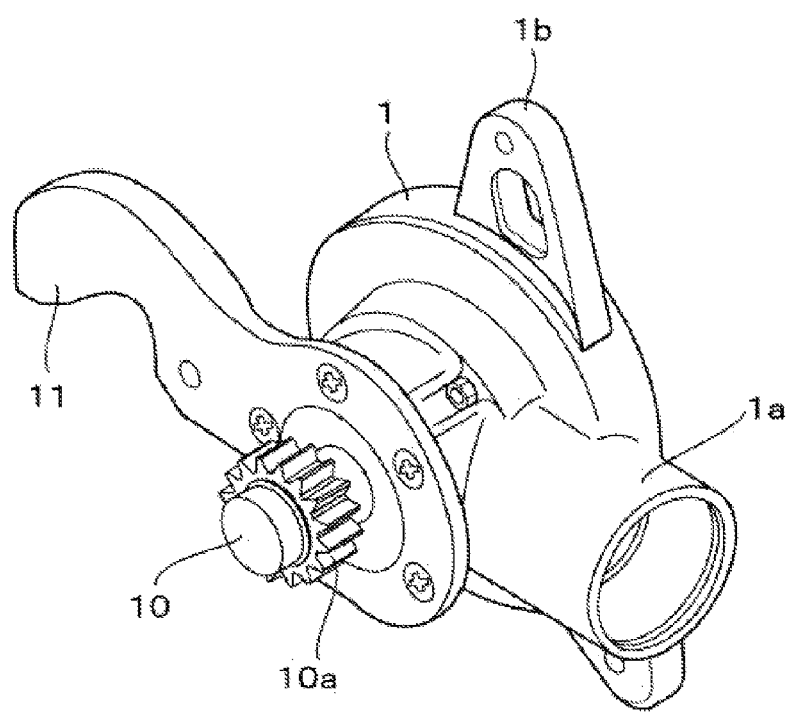
FIG. 11 is an explanatory diagram illustrating a state where a fixed cutting blade is fixed to a housing.
Figure 12:
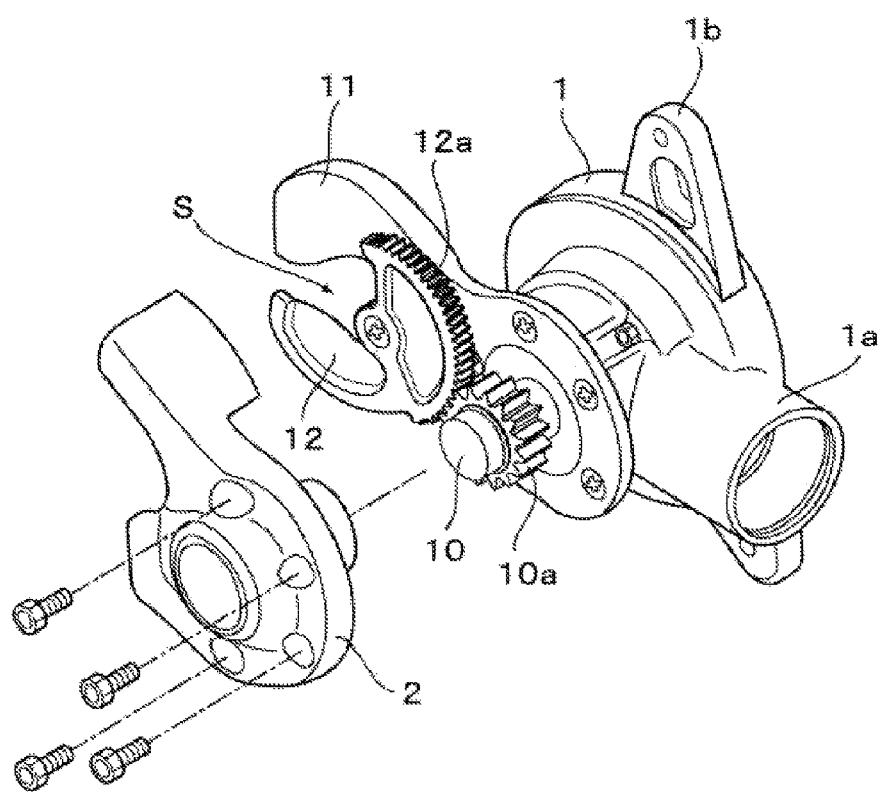
FIG. 12 is an explanatory diagram illustrating a state where a movable cutting blade is axially supported by a fixed cutting blade and an outer toothed portion of the movable cutting blade engages with an output gear of the second slider.
Figure 13:
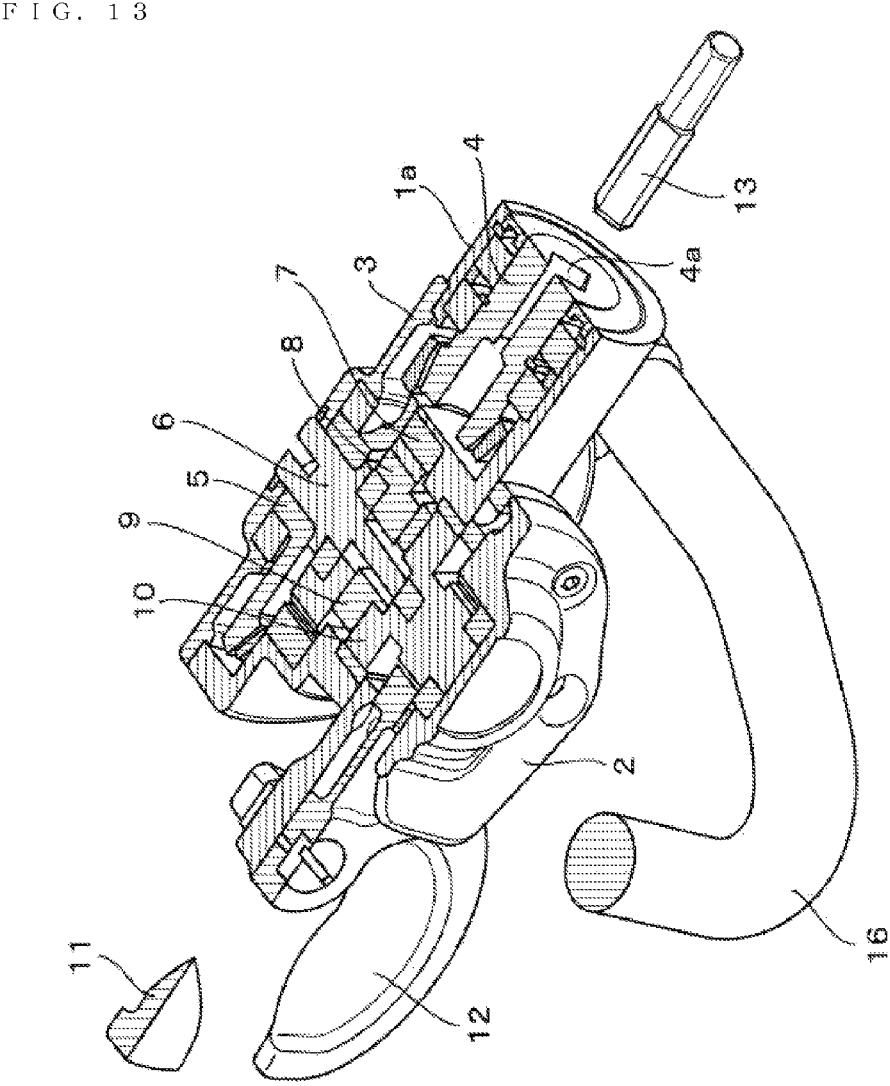
FIG. 13 is a cross-sectional view illustrating an assembled cable cutter.

On the other hand, as illustrated in FIG. 11, when the fixed cutting blade 11 is fixed to the left opening edge of the housing 1 through a screw and the second slider 10 of the Oldham coupling 15 is inserted from the right opening of the housing 1 together with the cover 3, the output gear 10*a* of the second slider 10 protrudes outward from the center opening hole of the fixed cutting blade 11. Accordingly, then as illustrated in FIG. 12, when the movable cutting blade 12 is axially supported by the fixed cutting blade 11 through a bolt so as to be openable and closable while engaging with the output gear 10*a* and the grip handle 16 formed in a U-shape is fixed to the upper and lower bracket portions 1*b* of the housing 1 while attaching the safety cover 2 covering the outer toothed portion 12*a* of the movable cutting blade 12, the electric cable cutter C may be easily assembled as illustrated in FIGS. 1 and 13.

Accordingly, when cutting various cables by using the electric cable cutter C with such a configuration, first, the rear end of the adapter pin 13 is connected to the chuck of the electric drill D. Then, when the front end of the adapter pin 13 is fitted to the square hole 4*a* of the small bevel gear 4 by a right hand while gripping the grip handle 16 of the cable cutter C by a left hand, the cable cutter C is attached to the electric drill D through the simple one-touch operation. Then, the movable cutting blade 12 is opened from the fixed cutting blade 11, and a cable (not illustrated) passes through a void space S defined between both cutting blades 11 and 12.

Then, when the outer toothed portion 12*a* of the movable cutting blade 12 engages with the output gear 10*a* of the second slider 10 of the Oldham coupling 15, the cutting is completely prepared. Furthermore, even in this embodiment, the fixed cutting blade 11 is positioned at the upper side and the movable cutting blade 12 is positioned at the lower side. However, since the respective cutting blades 11 and 12 are configured as a scissors type, there is no need to conduct an operation in which the cable is clamped while the movable cutting blade 12 is lifted in advance and engages with the output gear 10*a* as in the handcuff type. For this reason, when starting the cutting operation, both cutting blades 11 and 12 may simply and automatically engage with each other just by an operation in which the fixed cutting blade 11 positioned at the upper side is placed on the cable and the electric drill D is switched on.

Thus, when the electric drill D is switched on later, the small bevel gear 4 rotates and the large bevel gear 5 rotates along with the drive shaft 6. Accordingly, the planetary gear 8 attached to the eccentric shaft portion 6*a* of the drive shaft 6 rotates while engaging with the inner toothed gear 7, but the planetary gear 8 rotates while repeating the revolution and the rotation thereof due to the different number of teeth of both gears 7 and 8. However, since the planetary gear 8 is attached to the eccentric shaft portion 6*a* of the drive shaft 6 as described above, the rotation about the center axis of the drive shaft 6 may not be obtained. For this reason, the rotation of the planetary gear 8 needs to be corrected to the rotation about the center axis.

Therefore, the Oldham coupling 15 is used at this time, but since the first slider 9 of the Oldham coupling 15 includes the first concave portion 9*a* engaging with the convex portion 8*a* of the planetary gear 8 in a slidable manner, the first slider 9 rotates in a sliding manner while maintaining the unevenness engagement state in response to the rotation of the planetary gear 8. Then, since the second slider 10 of the Oldham coupling 15 includes the second concave portion 10*b* engaging with the first convex portion 9*b* of the first slider 9 in a slidable manner, the second slider 10 also rotates in a sliding manner while maintaining the unevenness engagement state in response to the rotation of the first slider 9.

Accordingly, even when there is a difference between the rotation axes, the difference is absorbed by the sliding rotation of the first and second sliders 9 and 10, and hence the drive shaft 6 and the output gear 10*a* of the second slider 10 rotate about the center axis at the constant speed.

Thus, the movable cutting blade 12 with the outer toothed portion 12*a* engaging with the output gear 10*a* moves so that the void space S becomes zero with the rotation of the output gear 10*a* of the second slider 10, and the cable as the cutting subject is extremely easily cut by the male and female blade portions of the respective cutting blades 11 and 12. Accordingly, it is possible for the operator to effortlessly and simply cut the cable. Further, since the outer toothed portion 12*a* of the movable cutting blade 12 is covered by the safety cover 2, it is possible to prevent an unexpected rolling accident when cutting the cable.

Further, when the cutting of the cable ends, the movement of the movable cutting blade 12 is also automatically stopped. This is because the outer toothed portion 12*a* of the movable cutting blade 12 is formed only in a predetermined range. Thus, the movement over the range releases the engagement with the output gear 10*a*. Further, when the cutting operation is continuously performed later, the electric drill D may be reversely rotated so as to return the movable cutting blade 12 to the initial standby state. Furthermore, even at this time, the movable cutting blade 12 is automatically stopped at the standby position since the outer toothed portion 12*a* is formed in a predetermined range.

Furthermore, in the above-described embodiment, since the differential gear mechanism 14 including the inner toothed gear 7 and the planetary gear 8 is used as the speed reducing mechanism unlike the related art, the housing may be decreased in thickness and size compared to the conventional worm gear mechanism, and hence the ability of the hand-held tool as the power source may be fully transferred to the cutting edge of the cutting blade. Further, since the operation of attaching and detaching the electric cable cutter to and from the hand-held tool is performed through the adapter pin 13, the operation may be simply performed as if the adapter is attached to and detached from a socket wrench. Further, the attachment subject is not limited to the electric drill D as in the related art, and the electric cable cutter may be attached to a chargeable electric driver, a pneumatic/electric/chargeable impact wrench without a drill chuck, or an electric/chargeable impact driver that is recently distributed to the market. Further, in a case where the electric drill D is switched off or the power source disappears due to the consumption of the chargeable battery, a manual socket handle may be used as an alternative.

Further, in the conventional cable cutter, the housing increases in size due to the use of the worm gear mechanism, and hence there is a concern that the safety is not sufficiently ensured when the cutter is placed on a table. However, in the embodiment, since the differential gear mechanism 14 is used, the housing 1 is largely thin, and hence the cutter may be reliably and safely placed on the table.

Since the electric cable cutter according to the invention may be used together with the existing hand-held tool as the power source, it is very advantageous to apply the electric cable cutter to the application example of cutting various cables such as a wire rope, an electric wire, a communication wire, and a reinforced bar.

REFERENCE SIGNS LIST

1 housing
1*a* cylindrical box portion
1*b* bracket portion
2 safety cover
3 cover
4 small bevel gear (orthogonal gear)
4*a* square hole
5 large bevel gear (orthogonal gear)
6 drive shaft
6*a* eccentric shaft portion
7 inner toothed gear
8 planetary gear
8*a* convex portion
9 first slider
9*a* first concave portion
9*b* first convex portion
10 second slider
10*a* output gear
10*b* second concave portion
11 fixed cutting blade
12 movable cutting blade
12*a* outer toothed portion
13 adapter pin
14 differential gear mechanism
15 Oldham coupling
16 grip handle
C electric cable cutter
D electric drill

The invention claimed is:

1. An electric cable cutter which is used together with a standard hand-held tool as a power source, the electric cable cutter comprising:
a housing which serves as a gear box;
a pair of cutting blades which is supported by the housing and is relatively opened and closed;
a pair of orthogonal gears to which power is input from the hand-held tool;
a drive shaft which includes an eccentric shaft portion attached to an output gear of the pair of orthogonal gears;
a differential gear mechanism which decelerates a rotation of the drive shaft; and
an Oldham coupling which corrects an eccentric rotation of an output gear of the differential gear mechanism to a rotation about a center axis,
wherein a circular-arc-shaped outer surface of a first cutting blade of the pair of cutting blades is axially supported by a second cutting blade of the pair of cutting blades so as to be openable and closable, the pair of cutting blades being provided with an outer toothed portion engaging with an output gear of the Oldham coupling and an input gear of the pair of orthogonal gears is connected to the hand-held tool through an adapter pin which is attachable and detachable through a one-touch operation.

2. The electric cable cutter according to claim 1,
wherein the pair of orthogonal gears includes large and small bevel gears, the large bevel gear being the output gear of the pair of orthogonal gears and the small bevel gear being the input gear of the pair of orthogonal gears.

3. The electric cable cutter according to claim 1,
wherein the differential gear mechanism includes an inner toothed gear fixed to the housing and a planetary gear as the output gear of the differential gear mechanism engaging with the inner toothed gear and attached to the eccentric shaft portion of the drive shaft, and one surface of the planetary gear is provided with a convex portion.

4. The electric cable cutter according to claim 3,
wherein the Oldham coupling includes a first slider without a gear and a second slider with a gear as the output gear of the Oldham coupling, one surface of the first slider is provided with a first concave portion engaging with the convex portion of the planetary gear in a slidable manner and the other surface of the first slider is provided with a first convex portion perpendicular to a thalweg direction of the first concave portion of the first slider, one surface of the second slider is provided with the output gear of the Oldham coupling engaging with the outer toothed portion of the second cutting blade, and the other surface of the second slider is provided with a second concave portion engaging with the first convex portion of the first slider in a slidable manner.

5. The electric cable cutter according to claim 1,
wherein a grip handle is formed in a U-shape having two end portions and each end portion thereof is fixed to a respective bracket portion of a pair of bracket portions on the housing.

6. The electric cable cutter according to claim 1, further comprising:
a safety cover which covers the outer toothed portion of the second cutting blade.

7. The electric cable cutter according to claim 2,
wherein the differential gear mechanism includes an inner toothed gear fixed to the housing and a planetary gear as the output gear of the differential gear mechanism engaging with the inner toothed gear and attached to the eccentric shaft portion of the drive shaft, and one surface of the planetary gear is provided with a convex portion.

8. The electric cable cutter according to claim 7,
wherein the Oldham coupling includes a first slider without a gear and a second slider with a gear as the output gear of the Oldham coupling, one surface of the first slider is provided with a first concave portion engaging with the convex portion of the planetary gear in a slidable manner and the other surface of the first slider is provided with a first convex portion perpendicular to a thalweg direction of the first concave portion of the first slider, one surface of the second slider is provided with the output gear of the Oldham coupling engaging with the outer toothed portion of the second cutting blade, and the other surface of the second slider is provided with a second concave portion engaging with the first convex portion of the first slider in a slidable manner.

9. The electric cable cutter according to claim 2,
wherein a grip handle is formed in a U-shape having two end portions and each end portion thereof is fixed to a respective bracket portion of a pair of bracket portions on the housing.

10. The electric cable cutter according to claim 3,
wherein a grip handle is formed in a U-shape having two end portions and each end portion thereof is fixed to a respective bracket portion of a pair of bracket portions on the housing.

11. The electric cable cutter according to claim 4,
wherein a grip handle is formed in a U-shape having two end portions and each end portion thereof is fixed to a respective bracket portion of a pair of bracket portions on the housing.

12. The electric cable cutter according to claim 7,
wherein a grip handle is formed in a U-shape having two end portions and each end portion thereof is fixed to a respective bracket portion of a pair of bracket portions on the housing.

13. The electric cable cutter according to claim 8,
wherein a grip handle is formed in a U-shape having two end portions and each end portion thereof is fixed to a respective bracket portion of a pair of bracket portions on the housing.

14. The electric cable cutter according to claim 2, further comprising:
a safety cover which covers the outer toothed portion of the second cutting blade.

15. The electric cable cutter according to claim 3, further comprising:
a safety cover which covers the outer toothed portion of the second cutting blade.

16. The electric cable cutter according to claim 4, further comprising:
a safety cover which covers the outer toothed portion of the second cutting blade.

17. The electric cable cutter according to claim 5, further comprising:
a safety cover which covers the outer toothed portion of the second cutting blade.

18. The electric cable cutter according to claim 7, further comprising:
a safety cover which covers the outer toothed portion of the second cutting blade.

19. The electric cable cutter according to claim 8, further comprising:
a safety cover which covers the outer toothed portion of the second cutting blade.

20. The electric cable cutter according to claim 9, further comprising:
a safety cover which covers the outer toothed portion of the second cutting blade.

* * * * *